United States Patent [19]

Okino

[11] Patent Number: 5,568,187
[45] Date of Patent: Oct. 22, 1996

[54] IMAGE PICKUP APPARATUS INCLUDING DISTANCE MEASUREMENT

[75] Inventor: Tadashi Okino, Kanagawa-ken, Japan

[73] Assignee: Canon Kabushiki Kaisha, Tokyo, Japan

[21] Appl. No.: 399,438

[22] Filed: Mar. 7, 1995

Related U.S. Application Data

[62] Division of Ser. No. 222,327, Apr. 4, 1994, which is a continuation of Ser. No. 896,893, Jun. 10, 1992, abandoned, which is a continuation of Ser. No. 240,927, Sep. 6, 1988, abandoned.

Foreign Application Priority Data

Sep. 10, 1987 [JP] Japan .................. 62-225374
Oct. 27, 1987 [JP] Japan .................. 62-269329

[51] Int. Cl.⁶ .................................................. H04N 9/73
[52] U.S. Cl. .......................................... 348/224; 348/227
[58] Field of Search ................................ 348/222, 223, 348/224, 227; 354/127.13, 131, 132, 134, 415, 416; 358/906, 909.1; H04N 9/73

[56] References Cited

U.S. PATENT DOCUMENTS

| | | | |
|---|---|---|---|
| 4,584,598 | 4/1986 | Kutargi . | |
| 4,771,307 | 9/1988 | Kuno et al. .............................. | 358/906 |
| 4,786,987 | 11/1988 | Fujimura et al. . | |
| 4,903,136 | 2/1990 | Iktani . | |
| 5,130,813 | 7/1992 | Oie et al. ................................ | 358/906 |
| 5,260,739 | 11/1993 | Nagata ..................................... | 348/223 |

*Primary Examiner*—Kim Yen Vu
*Attorney, Agent, or Firm*—Robin, Blecker, Daley & Driscoll

[57] ABSTRACT

An image pickup apparatus including a memory for storing color temperature data concerning an illuminating apparatus, a colorimetric circuit for measuring a color temperature of ambient light, an amplification circuit for controlling balance of color signals obtained from an image pickup element, and a controller for comparing the color temperature of the ambient light obtained from the colorimetric circuit with the color temperature data concerning the illumination apparatus and for controlling the amplification gain by the amplification circuit according to the comparison result to adjust the white balance, and further including a detecting circuit for detecting that the color temperature of the ambient light is not the color temperature along the black body radiation, wherein, depending on the detection of the detecting circuit, illumination is made by the illuminating apparatus to thereby take the white balance matched with the color temperature data concerning the illuminating apparatus. A distance measurement device is also provided for determining the distance to an object to assist in the adjustment of the white balance.

19 Claims, 12 Drawing Sheets

IMAGE PICKUP APPARATUS INCLUDING DISTANCE MEASUREMENT

This application is a division of application Ser. No. 08/222,327 filed Apr. 4, 1994; which is a continuation of Ser. No. 07/896,893, filed Jun. 10, 1992, abandoned, which is a continuation of Ser. No. 07/240,927, filed Sep. 6, 1992, abandoned.

BACKGROUND OF THE INVENTION

1. Field of the Invention

This invention relates to an image pickup apparatus having an image pickup element for converting an optical image to a plurality of color signals which are produced at an output thereof.

2. Description of the Related Art

In the image pickup apparatus receptive of an optical image for producing electrical signals for three primary colors, there is need to adjust the gain of the amplifier in the photoelectric converter circuit of each color system (or the so-called "white balance").

Conventionally, that this adjustment of the white balance is made to stationary light is dealt as the usual condition. Meanwhile, for the case of using the flash device, the only one that is available is that the white balance is unequivocally determined in accordance with the color temperature of the light emitted from the flash device.

However, in photography using the flash device, situations in which as the environmental condition of an object to be photographed, the contribution from the stationary light (ambient light) cannot be ignored are not few.

In that case, by the adjustment of the white balance in accordance with only one of the ambient light and the flash light emitted as in the prior art, satisfactory photographs cannot be made.

In principle, this adjustment of the white balance is established with respect to a single light source within a certain category. Therefore, as illumination is made with two or more light sources of utterly different color temperature, when all of their contributions are not negligible, it is substantially impossible to adjust the white balance. This is the same even in the case that an illumination light source for photography is used at the presence of ambient light.

Thus, for the case that an image is picked up by using the illumination light source for photography, if the condition is such that there is a great disparity between the color temperatures of the illumination light for photography and the ambient light and moreover that both cannot be ignored in respect to each other, it results that the white balance adjustment becomes substantially impossible to perform. Also, even in the case that the ambient light had a plurality of color temperatures as with cocktail lights under the condition that the illumination light source was not used, the white balance adjustment could not be made.

SUMMARY OF THE INVENTION

With such problems in mind, this invention has been made, and its object is to provide an image pickup apparatus which enables the white balance to be adjusted right when photographing even in the condition that the given ambient light has a largely different color temperature from that of its own illumination light source for photography, or that the ambient light is formed with a plurality of light sources of largely different color temperatures from each other.

Another object is to provide an image pickup apparatus which enables a correct white balance to be obtained by taking into account both of the contributions of the ambient light and the flash light emitted when photographing.

To achieve the above-described objects, in an embodiment of the invention, an image pickup apparatus is provided with inclusion of means storing color temperature data on an illumination device, colorimetric means for measuring a color temperature of ambient light, amplifying means for controlling the balance of color signals obtained from an image pickup element, and means for adjusting the white balance by comparing and judging the color temperature of the ambient light obtained from the colorimetric means and the color temperature data on the illumination device and by controlling the amplification gain by the amplifier means in accordance with the comparison judgment result.

By having the above-described arrangement, it is possible to properly adjust the white balance even when the color temperatures of the ambient light and its own illumination light source for photography differ largely, or when the ambient light is formed with a plurality of light sources of largely different color temperatures.

Also, to achieve the above-described objects, in another embodiment of this invention, an image pickup apparatus is provided with inclusion of means storing color temperature data on flash light emitting means, first detecting means for measuring a luminous intensity of flash light emitted from the flash light emitting means, second detecting means for measuring a luminance of an object to be photographed due to the ambient light, colorimetric means for measuring a color temperature of the ambient light, amplifying means for controlling the balance of color signals obtained from an image pickup element, and means for adjusting the white balance by controlling the amplification gain by the amplifier means in accordance with measured values produced by the first and second detecting means, the measured color temperature by the colorimetric means and the color temperature data on the flash light emitting means.

Since such an arrangement has been made, it becomes possible to obtain a white balance into which both of the color temperatures of the ambient light and the flash light emitted have been factored by controlling the balance of the color signals obtained from the image pickup element in accordance with the measured values concerning the light amounts of the flash light emitted and the ambient light, the value obtained by measuring the color temperature of the ambient light, and the color temperature data on the flash light emitting means.

Other objects and features of the invention will become apparent from the following written specification and drawings.

DETAILED DESCRIPTION OF THE PREFERRED EMBODIMENTS

Figure 1:
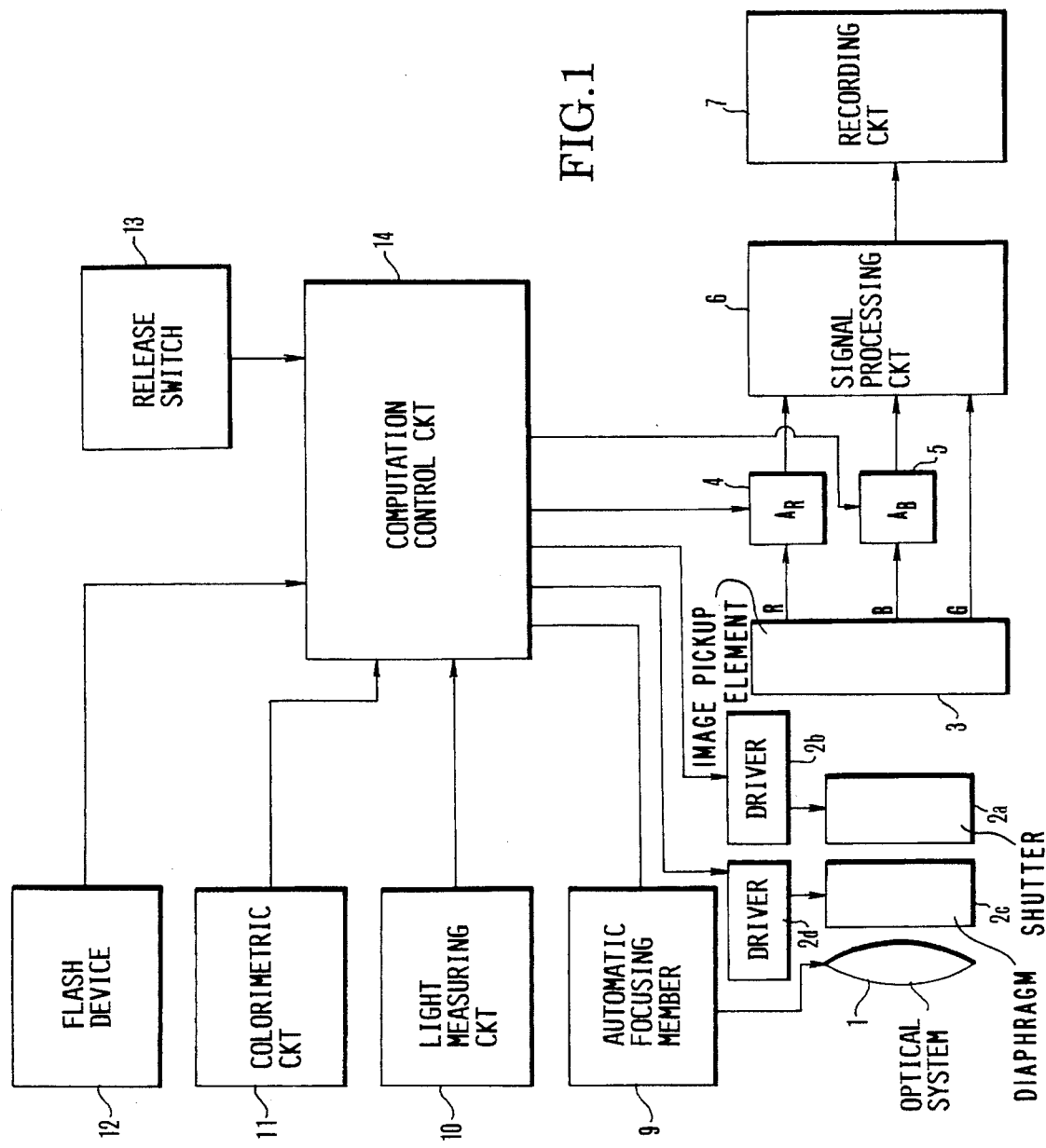
FIG. 1 is a block diagram illustrating the structure of a first embodiment of an image pickup apparatus according to the invention.

Referring to the drawings, the invention is described in great detail in connection with embodiments thereof. It should be noted that as the light source for photography to be used in the following embodiments a concrete example of a flash device is taken to explain, but instead of this flash device, a continuous light emitting light source may be used.

FIG. 1 is a block diagram illustrating the structure of an embodiment according to this invention.

In the figure, 1 is an optical system for forming an image of an object to be photographed; 2a is a shutter; 2b is a driver (drive circuit) for the shutter 2a; 2c is a diaphragm; 2d is a driver for the diaphragm 2c. An image pickup element 3 using, for example, CCD, converts an optical image of the object to electrical signals and takes out them as, for example, three primary color signals for red (R), blue (B), green (G). Amplifiers 4 and 5 of variable gain are inserted into respective electrical signal circuits for the primary colors R and B. By taking a balance of the gains of the amplifiers 4 and 5 to the color temperature of a light source illuminating the object, it is made to obtain a correct color reproduction or white balance. 6 is a signal processing circuit; 7 is a recording circuit; 8 is an automatic focusing member; 10 is a light measuring circuit; 11 is a colorimetric circuit for measuring the color temperature of ambient light; 12 is a flash device; 13 is a release switch; 14 is a computation control circuit. Incidentally, the color temperature of the flash device 12 as the light source is referred to as T1 ° K.

Figure 2:
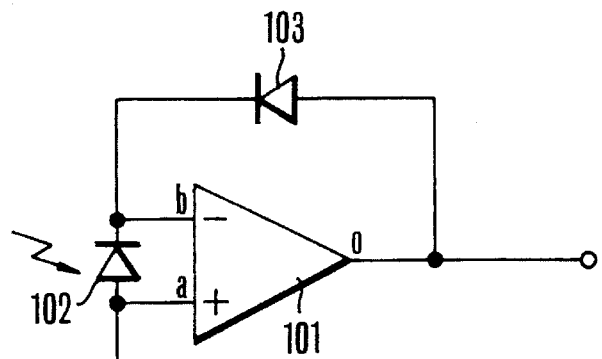
FIG. 2 is an electrical circuit diagram concretely illustrating the light measuring circuit in FIG. 1.

FIG. 2 is an electrical circuit diagram concretely illustrating the light measuring circuit 10 of FIG. 1. In the figure, 101 is an operational amplifier; 102 is a light receiving element such as silicon photodiode through which a current proportional to the intensity of radiating light flows; 103 is a logarithmic compression diode. In this circuit, a voltage $V_0$ produced at an output O of the operational amplifier 101 is expressed by $$V_0 = (kT/q)\log(I_{SPC}/I_S) \quad (1)$$

where k: Boltzmann constant
T: Ambient temperature (Absolute temperature)
q: Charge of one electron $I_S$: Backward saturation current of diode 103
$I_{SPC}$: Forward current flowing to diode 103 (=Photocurrent flowing through element 102∝Intensity of the received light)

That is, the light measurement output voltage is proportional to the logarithm of the received light intensity. Also, $$(kT/q)\log 2 \approx 18 \text{ mV} \quad (2)$$

is given. From this equation (2) and the equation (1), it becomes higher by 18 mV for every 2 times increase of the luminance of the object (∝the intensity of light incident on the light measuring circuit 10). Therefore, the object luminance can be found from the measurement of the output voltage of the light measuring circuit 10.

Figure 3:
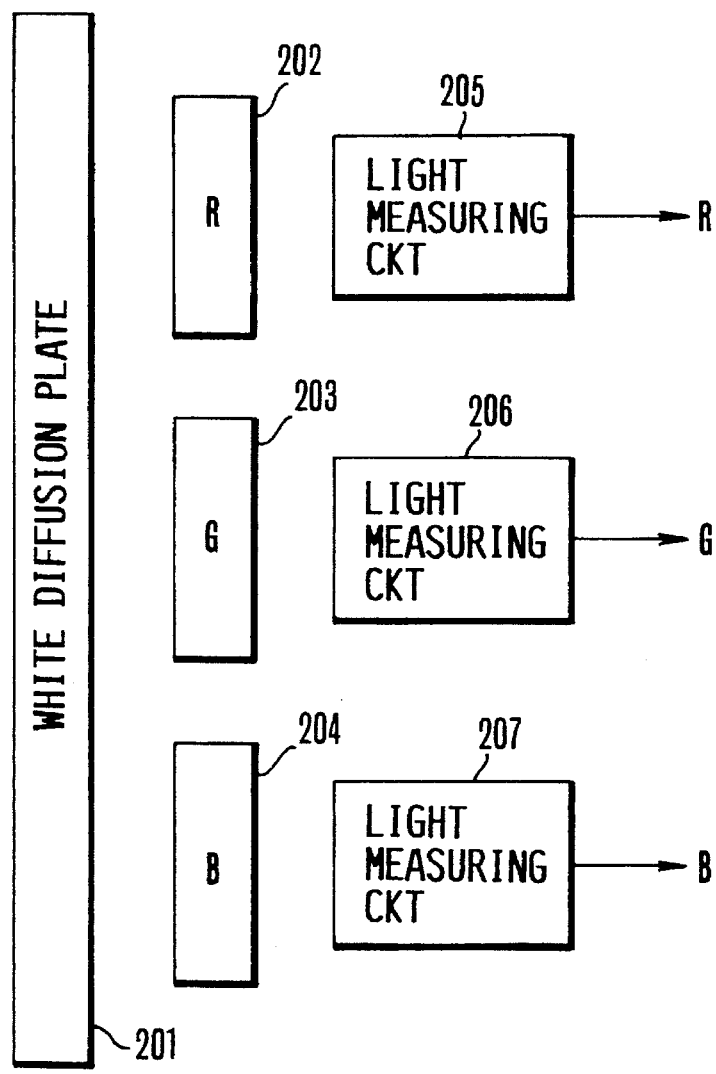
FIG. 3 is a block diagram concretely illustrating the colorimetric circuit in FIG. 1.

Also, FIG. 3 is a block diagram concretely illustrating the colorimetric circuit 11 of FIG. 1. In FIG. 3, 201 is a white diffusion plate. Color filters 202, 203, 204 each pass only one of the red, green and blue colors respectively therethrough. Light measuring circuits 205, 206, 207 each are exactly the same as that shown in FIG. 2.

In this circuit, taking the difference between the output voltages of the light measuring circuits 205 and 206 gives $$(kT/q)\log(I_{SPC}(G)/I_S) - (kT/q)\log(I_{SPC}(R)/I_S) = (kT/q)\log(I_{SPC}(G)/I_{SPC}(R)) \quad (3)$$

Hence the ratio of the green component to the red component of the light incident on the colorimetric circuit 11 is found. Likewise, taking the difference of the outputs of the light measuring circuits 206 and 207 gives $$(kT/q)\log(I_{SPC}(G)/I_{SPC}(B)) \quad (4)$$

Hence the ratio of the green component to the blue component of the light incident on the colorimetric circuit 11 is found. In such a manner, the ratio of (Red component):(Green Component):(Blue Component) (5)

of the incident light is obtained. Thus, the color temperature of the incident light is determined.

The foregoing is the arrangement of one embodiment of the invention. Referring to the flowchart of FIG. 4, its operation is described below.

Figure 4:
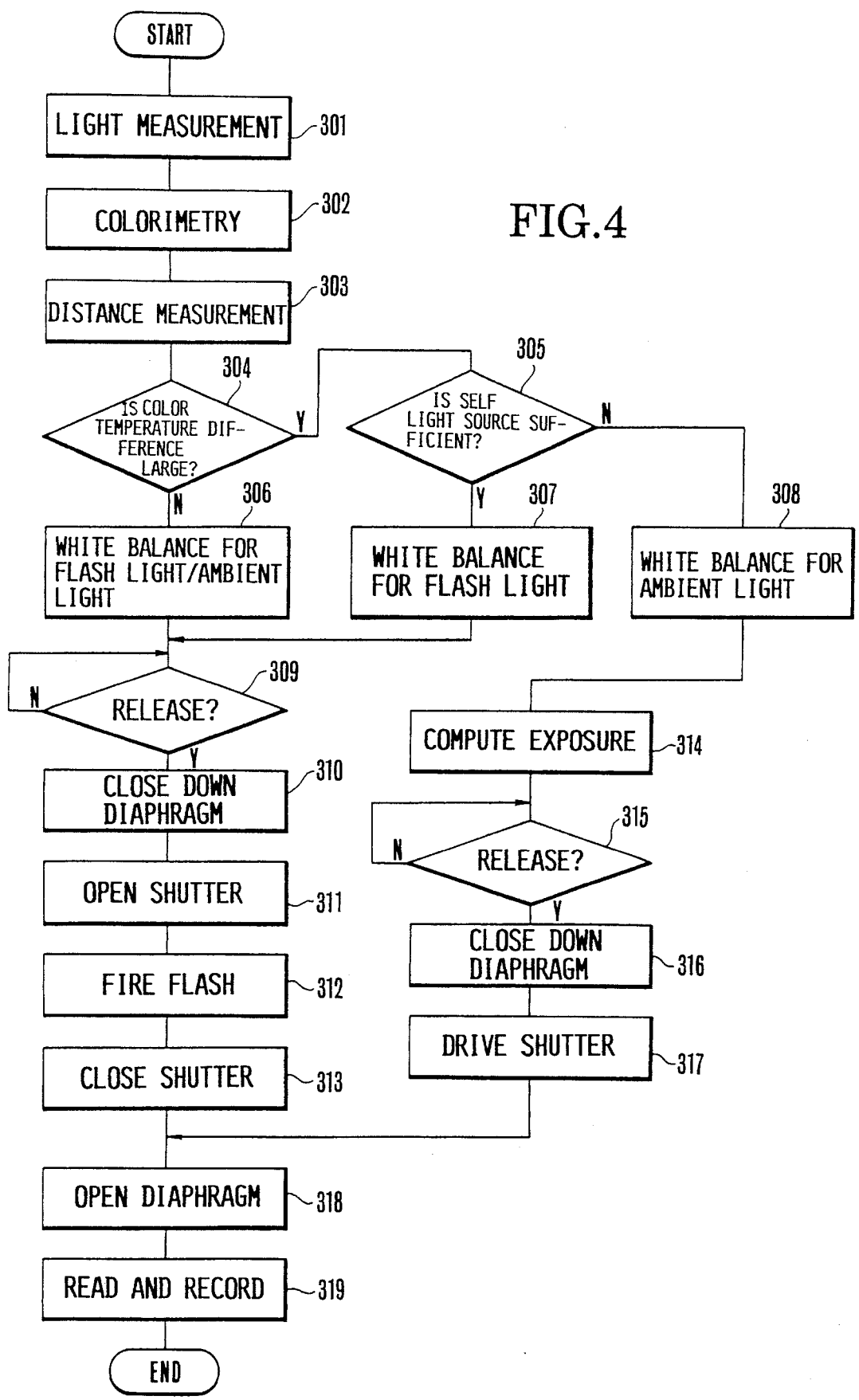
FIG. 4 is a flowchart illustrating the operation in the image pickup apparatus of FIG. 1.

FIG. 4 is a flowchart illustrating the operation in the image pickup apparatus of FIG. 1.

At first, in FIG. 4, when an electric power source is thrown, the light measuring circuit 10 and 19 the colorimetric circuit 11 operate in steps 301 and 302 to carry out light measurement and colorimetry. The color temperature of the ambient light of the colorimetric result at that time is referred to as $T_2$. Further, the automatic focusing member 9 operates, adjusting the optical system 1 to effect focusing. The distance D to the object is measured. That value D is inputted to the computation control circuit 14. From this value D and the full emitted light amount (GNo) of the flash device 12, an aperture (FNo) with which a correct exposure amount can be obtained is sought by $$FNo = GNo/D \quad (6)$$

(step 303).

Then, the color temperature $T_2$ obtained from the colorimetry result in the step 302 is compared with the color temperature $T_1$ of the inherent light from the flash device 12. Whether or not that difference is above a certain value (for example, 1000° K.) is determined (step 304).

If the color temperature difference is small (step 304-N), because the difference between the colors of the ambient light and the light of the flash device 12 is little, photography is performed with the white balance taken in both by adjustment to one or average of the color temperatures of the ambient light and the flash device 12 (step 306).

Here, the white balance adjusting method for match to the above-described average color temperature is briefly explained.

The strength of the irradiation light on the object by the flash device 12 is $(GNo/D)^2$, and its ratio to the irradiation strength Bv of the ambient light is defined as:

$$Bv:(GNo/D)^2 = k:l \qquad (7)$$

$$k+l=1 \qquad (8)$$

Assuming that the white balance corresponding to the color temperature $T_1$ of the inherent flash light memorized in the memory device is, for example, $$R:B:G = A_{R2}:AB2:1 \qquad (9)$$

then the amplification degrees $A_R$ and $A_B$ of the amplifiers 4 and 5 must be made to fulfill the relationship:

$$A_R = kA_{R1} + l'A_{R2} \qquad (10)$$

$$A_B = kA_{B1} + lA_{B2} \qquad (11)$$

And a white balance that has taken into account the contributions of the ambient light and the flash light is obtained.

It should be noted that instead of the equations (10) and (11), $$A_R = k'A_{R1} + l'A_{R2} \qquad (12)$$

$$A_B = k''A_{B1} + l''A_{B2} \qquad (13)$$

are put, and the correspondence from k and l to k', k'' and l', l'' in the form of a table or a function by experiments so as to obtain an optimum white balance is previously written in the storage area in the computation control circuit 14. With this when used in computation for adjustment of the white balance, a further improvement of the color reproduction can be achieved.

If the color temperature difference is large (step 304-Y), the white balance that does not give a sense of incompatibility to both of the ambient light and the flash light is impossible. For this reason, the white balance is given to only one of them so that photography is made under the condition that the amount of the other light is negligible as compared with that light. Thus, a correct color reproduction can be obtained.

On this account, whether or not a photography by so intense flash light as to cancel the ambient light is possible is judged (step 305). In other words, whether or not the luminance of the ambient light is sufficiently smaller than the luminance of the flash light under the photographic conditions of the FNo determined by the equation (6) and the strobe synchronizable shutter time as is determined from the the light measurement result of the step 301, is judged.

If the luminance of the ambient light is sufficiently small (step 305-Y), then the white balance is adjusted to only the color temperature of the flash light, so that photography is made with the flash light illumination at the main one (step 307).

Also, if the luminance of the ambient light is not sufficiently small (step 305-N), flash photography is abandoned, and photography is made with illumination of the ambient light alone. Hence, the white balance is adjusted to the color temperature of the ambient light (step 308).

When in the step 306 or the step 307 of FIG. 4, each of which is to carry out emission of flash light, actuation of the release switch 13 is then waited for (step 309). And, when the release switch 13 is actuated, the diaphragm 2c is closed down (step 310), the shutter 2a is driven by the driver 2b to fully open (step 311), and the flash device 12 is fired (step 312). After that, the shutter 2a is closed (step 313) and the diaphragm 2c is opened (step 318). For the next period of one field (or frame), information concerning the object image is read out from the image pickup element 3, and recorded on a recording medium (step 319).

In the case of the step 308 of FIG. 4, the exposure is controlled in accordance with the exposure value computed based on the luminance of the ambient light. For this purpose, the exposure value is computed from the result of the step 301 of FIG. 4 (step 314).

Figure 5:
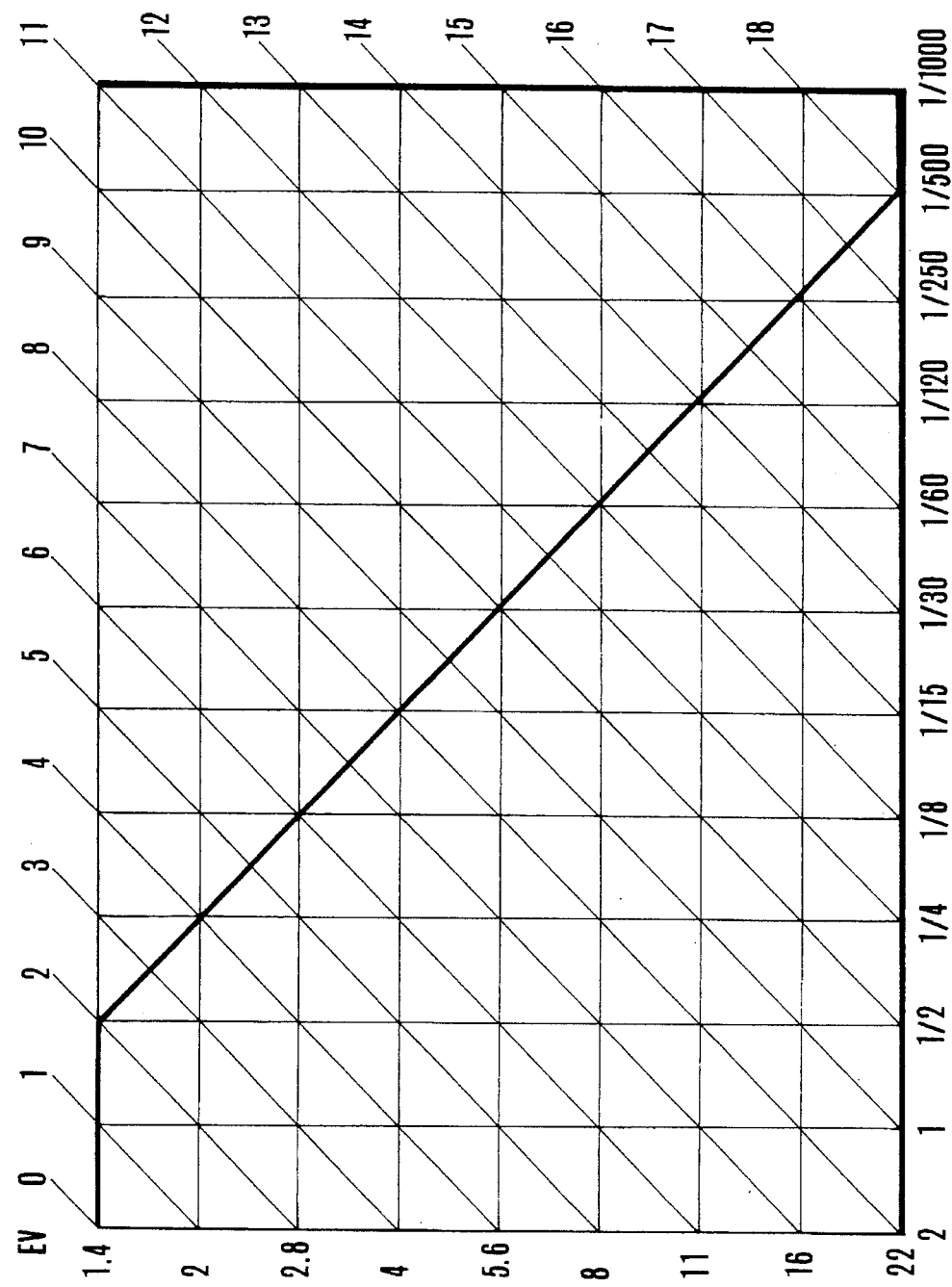
FIG. 5 is a program line diagram usable in exposure determination of the ambient light in this embodiment.

This exposure value may be obtained according to a program as shown in FIG. 5. It is also possible to compute it according to the previously determined mode (shutter priority, aperture priority, etc.).

FIG. 5 is a graph for the program used in determining the exposure with the ambient light in this embodiment, taking the shutter speed in the abscissa and the aperture value in the ordinate.

After that, actuation of the release switch 13 is waited for (step 315). When the release switch 13 is actuated, the diaphragm 2c is closed down to the computed value of the step 314 (step 316), and the shutter 2a is driven by the shutter driver 2b to expose the image pickup element 3 for the time determined in the step 301 (step 317). After that, the diaphragm 2c is opened again (step 318), and further a reading and recording operation is carried out (step 319).

By making it like this, the flash device 12 is hindered from firing to save energy, and an optimum shot setting to the ambient light or stationary light photography can be done.

Next, a second embodiment is described.

Figure 6:
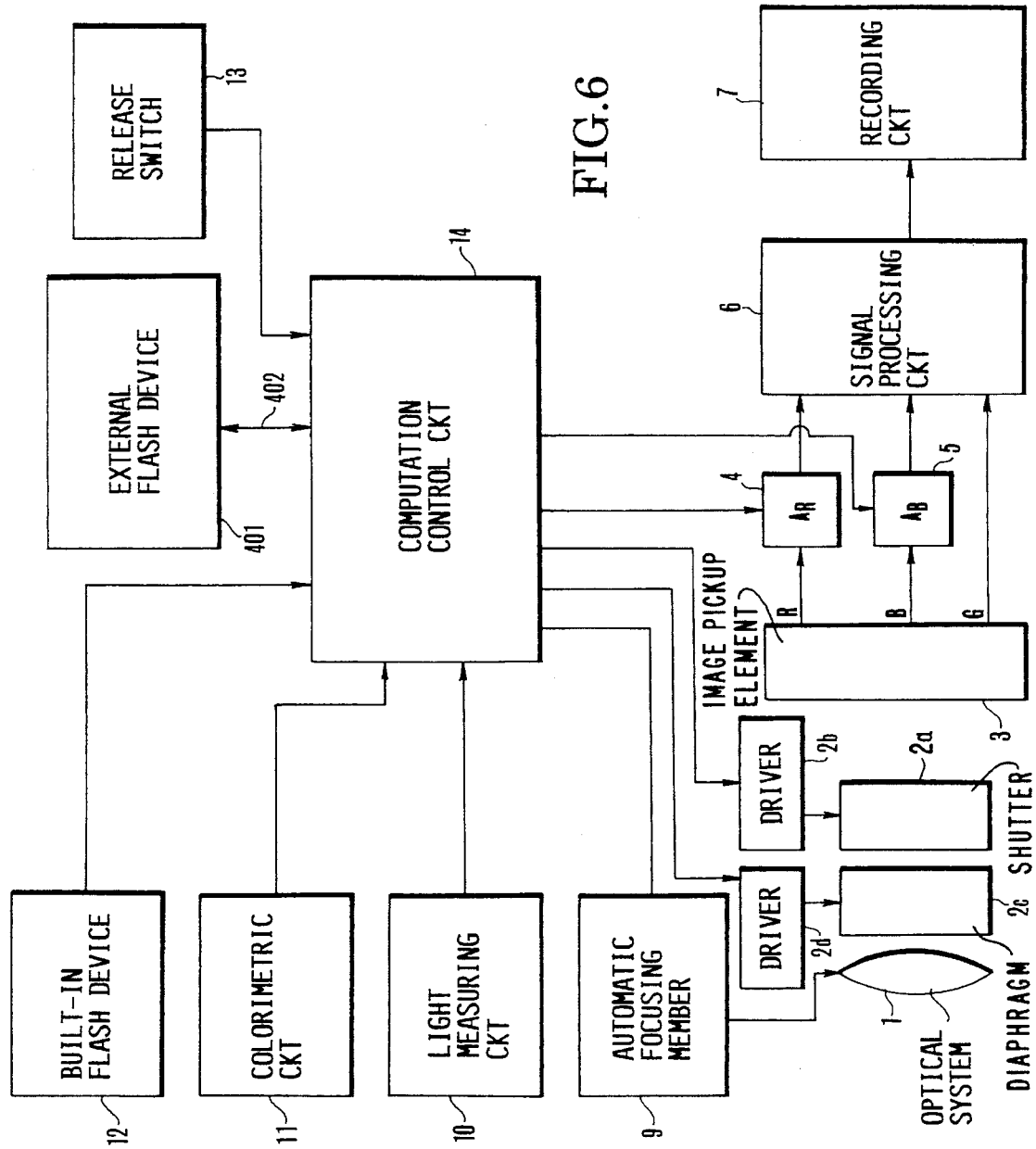
FIG. 6 is a block diagram illustrating the structure of a second embodiment of the image pickup apparatus according to the invention.

FIG. 6 is a block diagram illustrating the arrangement of the second embodiment of the image pickup apparatus according to the invention. Since this is different only in part from the apparatus of FIG. 1, explanation is given only to this different point. That is, the flash device 12 is the one having a light amount GNoA and built in the image pickup apparatus, and further this apparatus is provided also with an external (releasably attached) flash device 401 of GNoB. The flash device 401 is connected to the computation control circuit 14 through a line 402. From the flash device 401 to the computation control circuit 14, whether or not the self is in a possible-to-fire (fully charged) state, its own light amount GNoB, and its own color temperature $T_2$ are inputted. From the computation control circuit 14 to the flash device 401, a command for firing is outputted.

Figure 7:
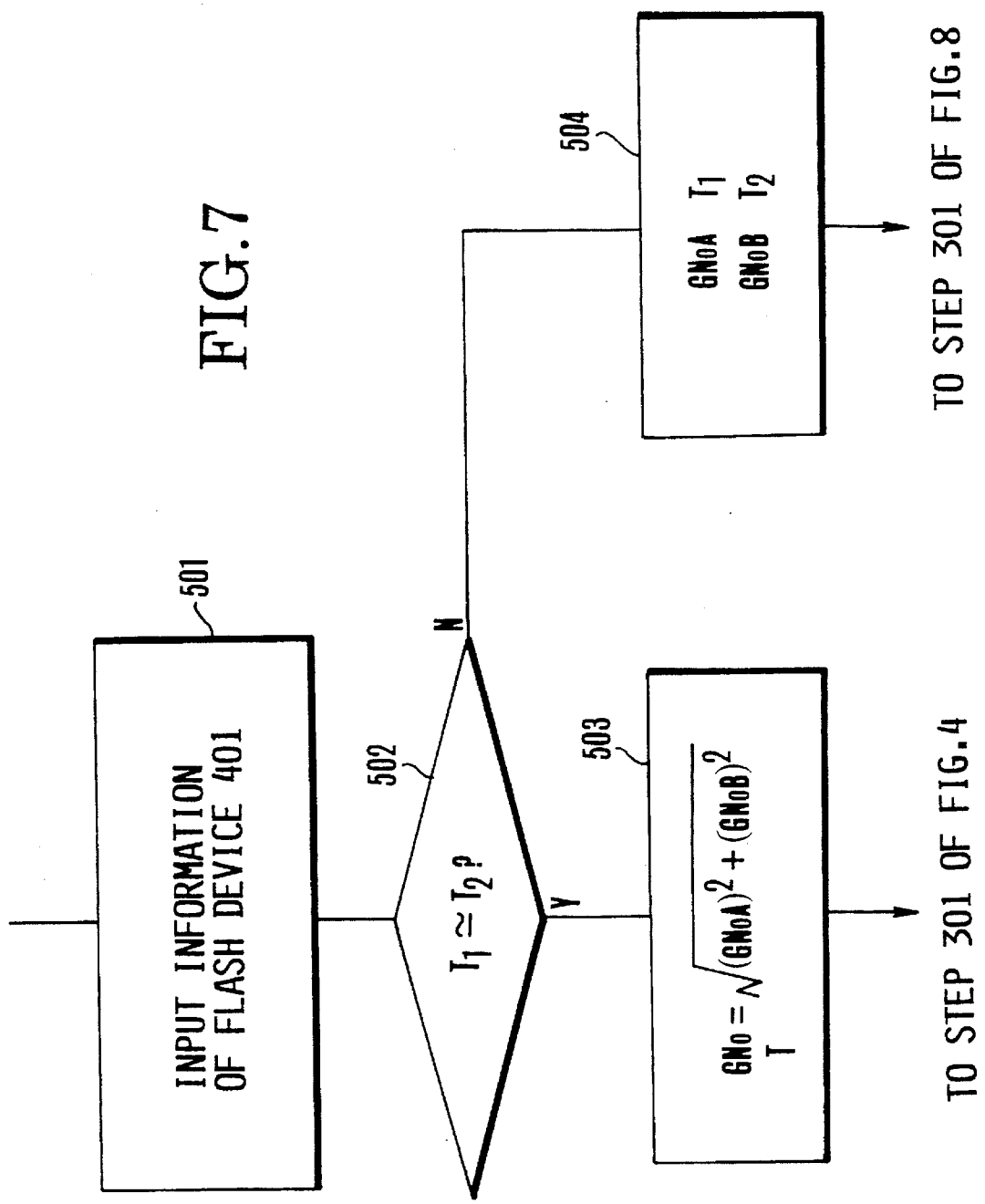
FIG. 7 is a flowchart illustrating the operation of the apparatus of FIG. 6.

FIG. 7 is a flowchart illustrating the operation of the apparatus of FIG. 6. In FIG. 7, when an electric power source switch (not shown) is thrown, the computation control circuit 14 of the image pickup apparatus reads in information on the completion of charging, light amount and color temperature concerning the external flash device 401 (step 501). Thereupon, whether or not the color temperature $T_1$ of the built-in flash device 12 is near the color temperature $T_2$ of the external flash device 401 is judged (step 502). If the values of the color temperatures $T_1$ and $T_2$ are near (step 502-Y), the flash devices 12 and 401 can be regarded as a single flash device whose light amount is $$GNo = \sqrt{(GNoA)^2 + (GNoB)^2} \qquad (14)$$

In this case, the subsequent operation is carried out in a similar manner to that of the step 301 and those that follow of the flowchart of FIG. 4. Their explanation is omitted. It should be noted that even if the color temperature is substituted for by either one (for example, the one of larger light amount), no large error is produced. For a more rigorous case, it may be made to be the average value of the weighted color temperatures $T_1$ and $T_2$ at the light amount ratio.

Also, if the values of the color temperatures T and $T_2$ were apart (step 502–N), each light source is regarded as lying independently (step 504). In this case, the subsequent operation advances to a step 301 of the flowchart of FIG. 8. In the following, explanation is made according to this flowchart.

Figure 8:
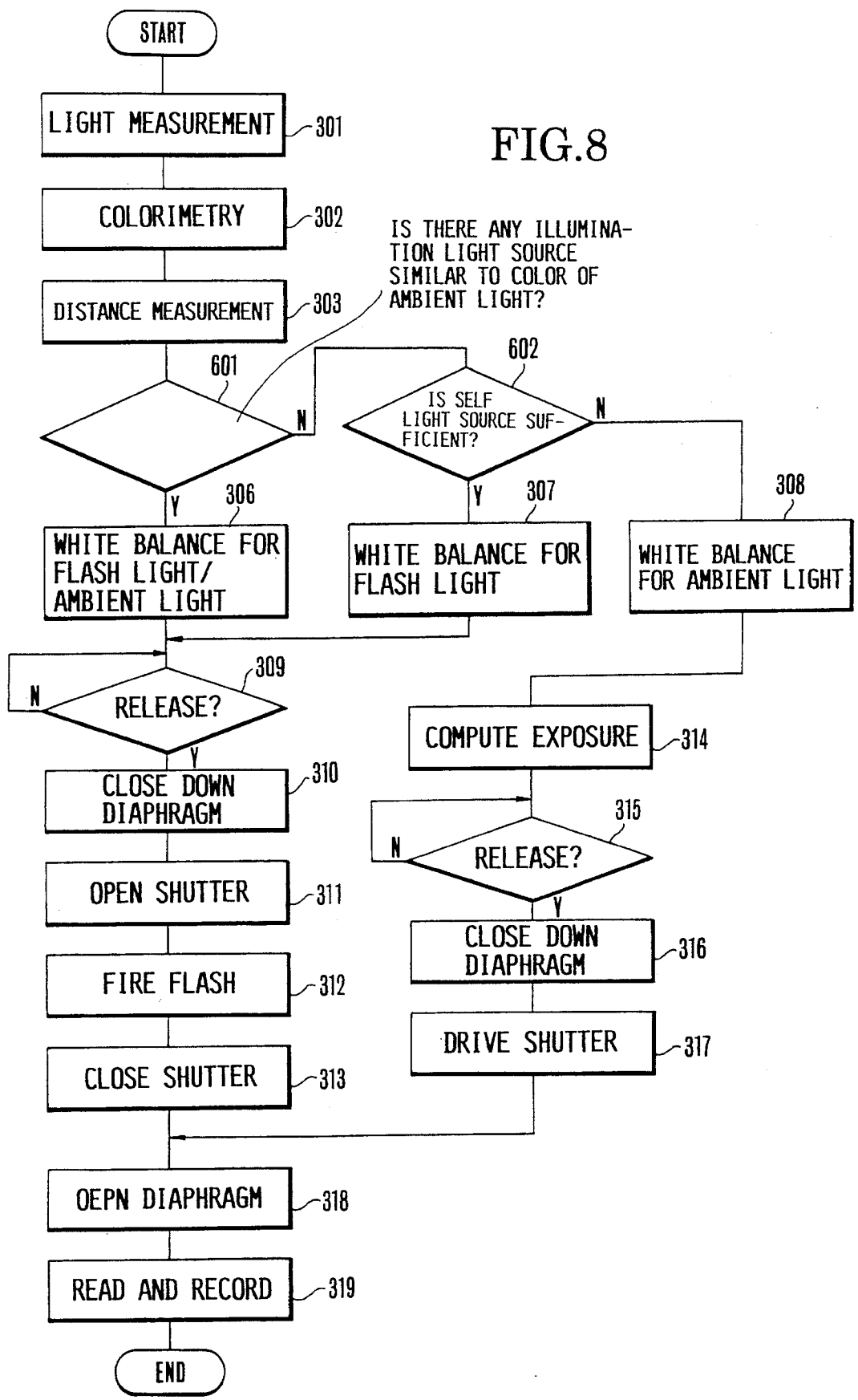
FIG. 8 is a flowchart illustrating the operation in the circuit of FIG. 6 in the case when the color temperature of the built-in flash device largely differs from the value of the color temperature of a flash device externally attached.

FIG. 8 is a flowchart illustrating the operation of the circuit of FIG. 6 in the case when the color temperature $T_1$ of the built-in flash device 12 and the color temperature $T_2$ of the external flash device 104 were apart. Since it is similar to FIG. 4 and different only in part, the different parts only are described.

The steps 301, 302 and 303 for light measurement, colorimetry and distance measurement are done in exactly the same way as FIG. 4. Then, whether or not, there is any of the color temperatures $T_1$ and $T_2$ of the flash devices 12 and 401 which is near the color temperature $T_A$ of the ambient light is judged (step 601). If there is the near one, then photography is made with both illuminations of that near one and the ambient light (step 306). The subsequent operation is carried out in a similar manner to FIG. 4. (Its explanation is omitted.)

Also, if the color temperatures $T_1$, $T_2$ and $T_A$ of the flash devices 12 and 401 and the ambient light are wide apart from one another (step 601–N), then the same judgment as the case described in the step 305 of FIG. 4 is made to the one of the flash devices 12 and 401 which is of larger light amount. That is, judgment of whether or not a photography that can cancel the ambient light by the illumination device the self possesses is possible is carried out (step 602). And, if an illumination that can cancel the ambient light is possible (step 602–Y), then photography is made with the white balance adjusted to that illumination under the condition of canceling the ambient light (step 602–N). Also, if the ambient light cannot be canceled by the illumination device the self possesses (step 602–N), then without using the illumination device the self possesses, photography is made with the white balance adjusted to the ambient light (step 308).

Steps 307 and 308 and those that follow of FIG. 8 are exactly the same as those of FIG. 4. So, their explanation is omitted.

In the foregoing description, if the flash devices 12 and 401 both are flash devices, occasions that their respective color temperatures become $T_1 \approx T_2$ would be many. But, if one of them is a tungsten lamp, halogen lamp, fluorescent lamp, etc. the individual color temperatures $T_1$, $T_2$ are utterly different. And, the present invention includes such a case of different photographic illumination light sources, of course.

Next, a third embodiment is described. The concrete circuit structure of this embodiment is the same as the circuit of FIG. 1.

Figure 9:
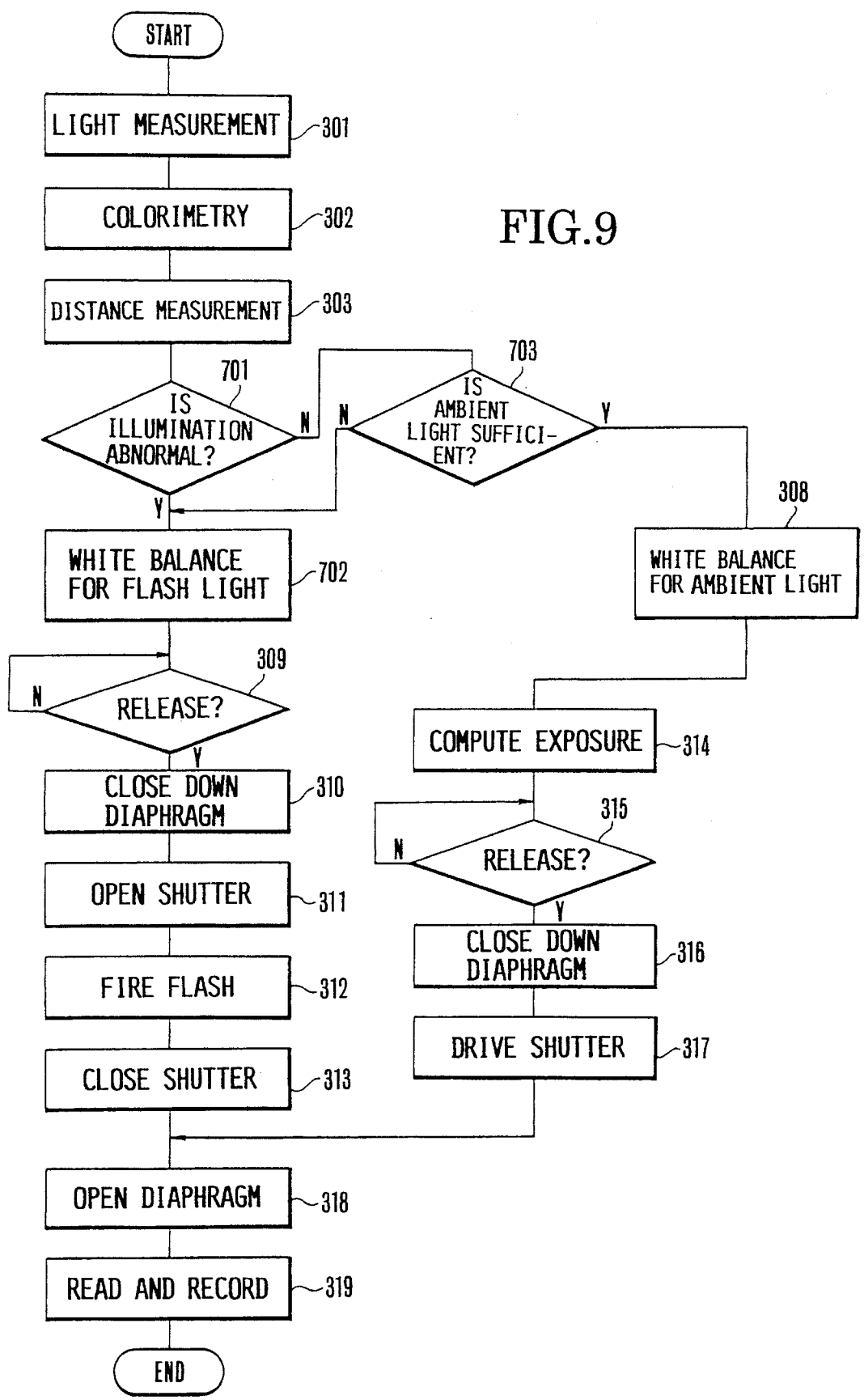
FIG. 9 is a flowchart to explain the operation of a third embodiment of this invention.

FIG. 9 is a flowchart to explain the operation of this third embodiment. This third embodiment is suited to a case that the ambient light has two or more light sources of utterly different spectral distribution, or like other cases. Since FIG. 9 is almost the same as FIG. 4, the different parts only will be described.

Steps 301–303 are exactly the same. That is, the automatic focusing member 9 operates to adjust the optical system 1 to effect focusing and to measure the distance D to an object to be photographed (step 303). After that, in a step 701 of FIG. 9, whether the illumination condition does not differ from the usual one is judged.

Figure 10A:
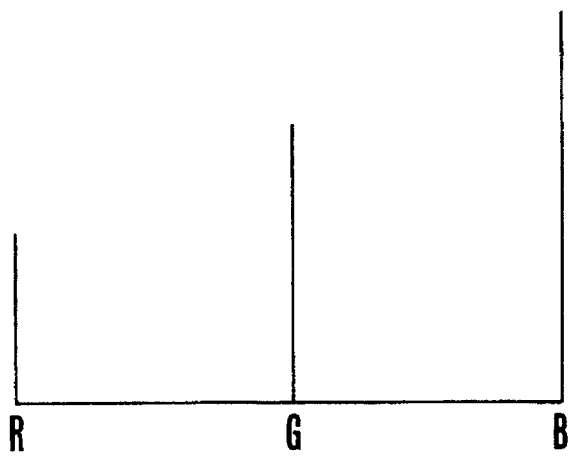
FIGS. 10(a), 10(b) and 10(c) are diagrams concretely illustrating the R, G and B outputs in the colorimetric circuit.
Figure 10B:
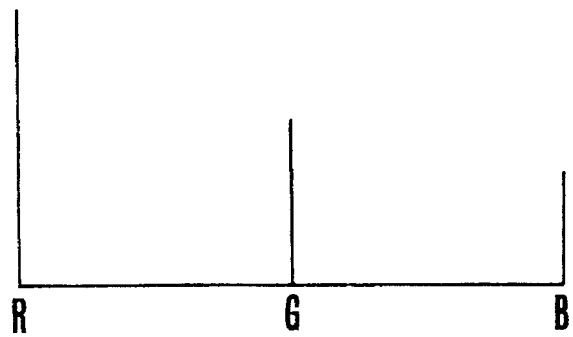
Figure 10C:
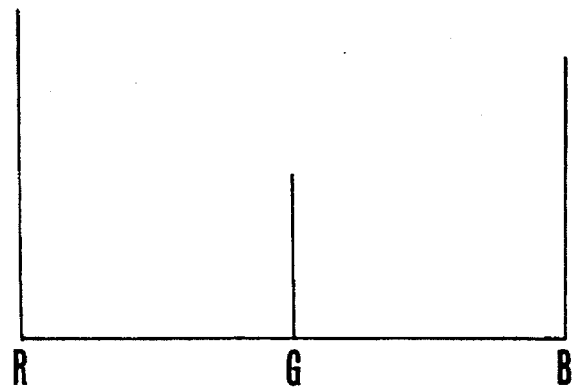

This function is explained by using FIGS. 10(a) to 10(c). If the R, G and B outputs of the colorimetric circuit 11 are B>G>R as shown in FIG. 10(a), or B<G<R as shown in FIG. 10(b), the color temperature is regarded as high or low respectively, and the white balance can be taken as the case may be. But, if, for example, B>G, R>G occurred as shown in FIG. 10(c), it is regarded as the presence of two light sources, red and blue. Hence, to take the right white balance becomes impossible. Though an extreme example is cited here for the purpose of simplifying the explanation, the case that to take the white balance becomes impossible due to the large difference from the spectrum of the black body radiation is also considered likewise as FIG. 10(c).

In such a case (step 701–Y), the flash device 12 is made to fire so as to cancel the ambient light, while the white balance is adjusted to the color of the emitted light of the flash device 12 (step 702). If as the illumination condition of the ambient light is near the spectrum of the black body radiation, the white balance adjustment is judged to be possible (step 701–N), then whether or not the ambient light amount is sufficient to photography is further judged (step 702). If it is sufficient (step 702–Y), photography is made with the ambient light alone (step 308). If it is insufficient, then photography can be made with the illumination of the flash device 12 in the condition that the ambient light can be ignored (step 702).

The functions of steps 309 and 308 and those that follow of FIG. 9 are exactly the same as those of FIG. 4. So, their explanation is omitted.

With the use of such an apparatus of the first to the third embodiments as has been described above, even if the colors of the ambient light and the illumination light for photography are largely different, the defective color reproduction due to the interference of them with each other can be eliminated. Also in the case that the ambient light is abnormal, a good color reproduction can be obtained.

Figure 11:
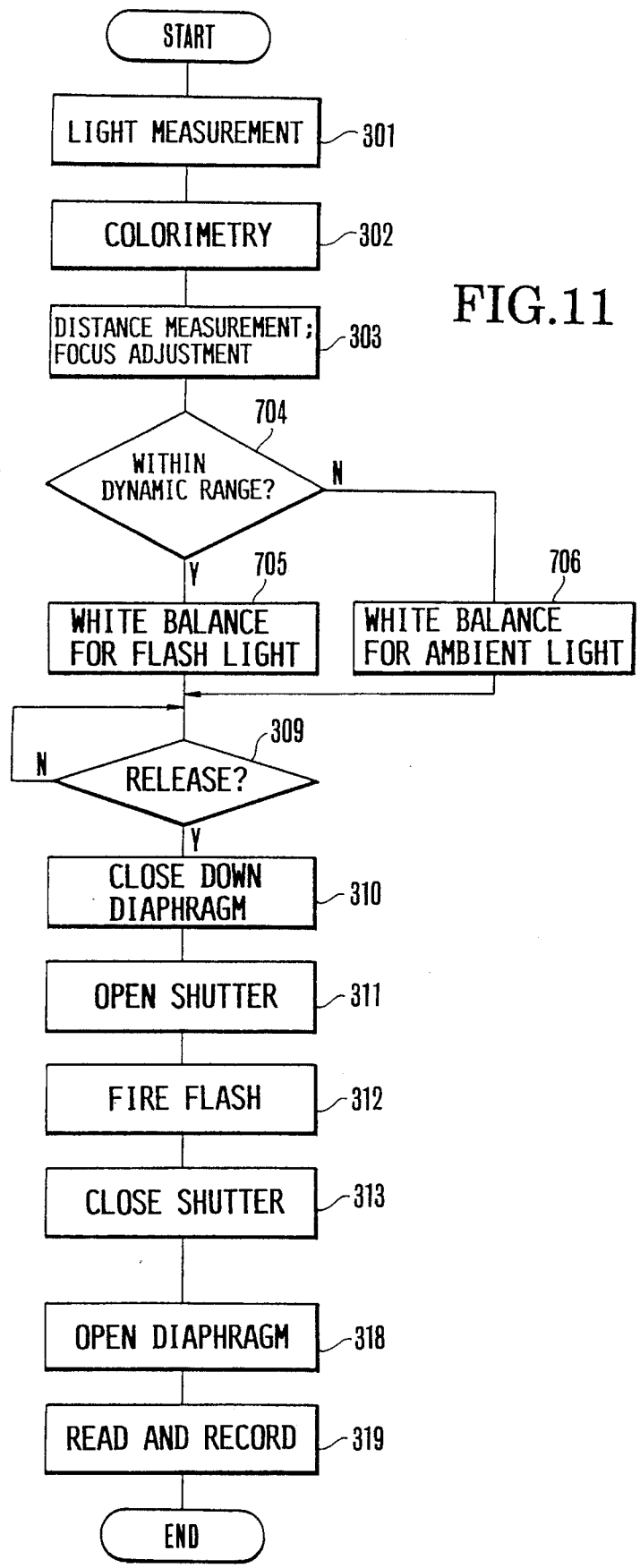
FIG. 11 is a flowchart to explain the operation of a fourth embodiment of this invention.

Next, while referring to the flowchart of FIG. 11, a fourth embodiment of the image pickup apparatus according to this invention is described. The hardware used in this embodiment is similar to that of the first embodiment, so it is omitted.

When an electric power source (not shown) is thrown, the light measuring circuit 10 and the colorimetric circuit 11 operate likewise as in the first embodiment, and the light measurement and colorimetry are carried out (steps 301, 302).

Also, the automatic focus adjusting member 9 operates to adjust the optical system 1 to effect focusing and to measure the distance D to an object to be photographed. Its value is inputted to the computation control circuit 14 to find an aperture FNo by the equation (6) of the first embodiment (step 303).

Next, by the computation control circuit 14, whether or not the object lies in a possible range of flash light photography is judged (step 704). In other words, the aperture FNo obtained by the equation (6) is a larger value than the full open FNo of the photographic lens, flash light photography is judged to be possible (within the dynamic range) (Y).

Conversely when it is a small value, flash light photography is judged to be impossible (outside the dynamic range)(N).

In the case that it has been judged to be within the dynamic range, a similar white balance adjustment to the step 307 of FIG. 4 described in the first embodiment is carried out (step 705). In the case that it has been judged to be outside the dynamic range, the flash light emission is ignored, and a similar white balance adjustment of the ambient light to the step 308 of FIG. 4 only is carried out (step 706).

In such a manner, the adjusting method of the white balance is determined. Then, the release switch 13 is actuated (step 309), the diaphragm 2c is closed down (step 310), the shutter 2a is driven by the driver 2b to fully open (step 311), and the flash device 12 is fired (step 312). After that, the shutter 2a is closed (step 313), the diaphragm 2c is opened (step 318), and information concerning the object image is read out from the image pickup element 3 for the next period of one field (or frame period) and recorded on a recording medium through the recording circuit 7 (step 319).

Figure 12:
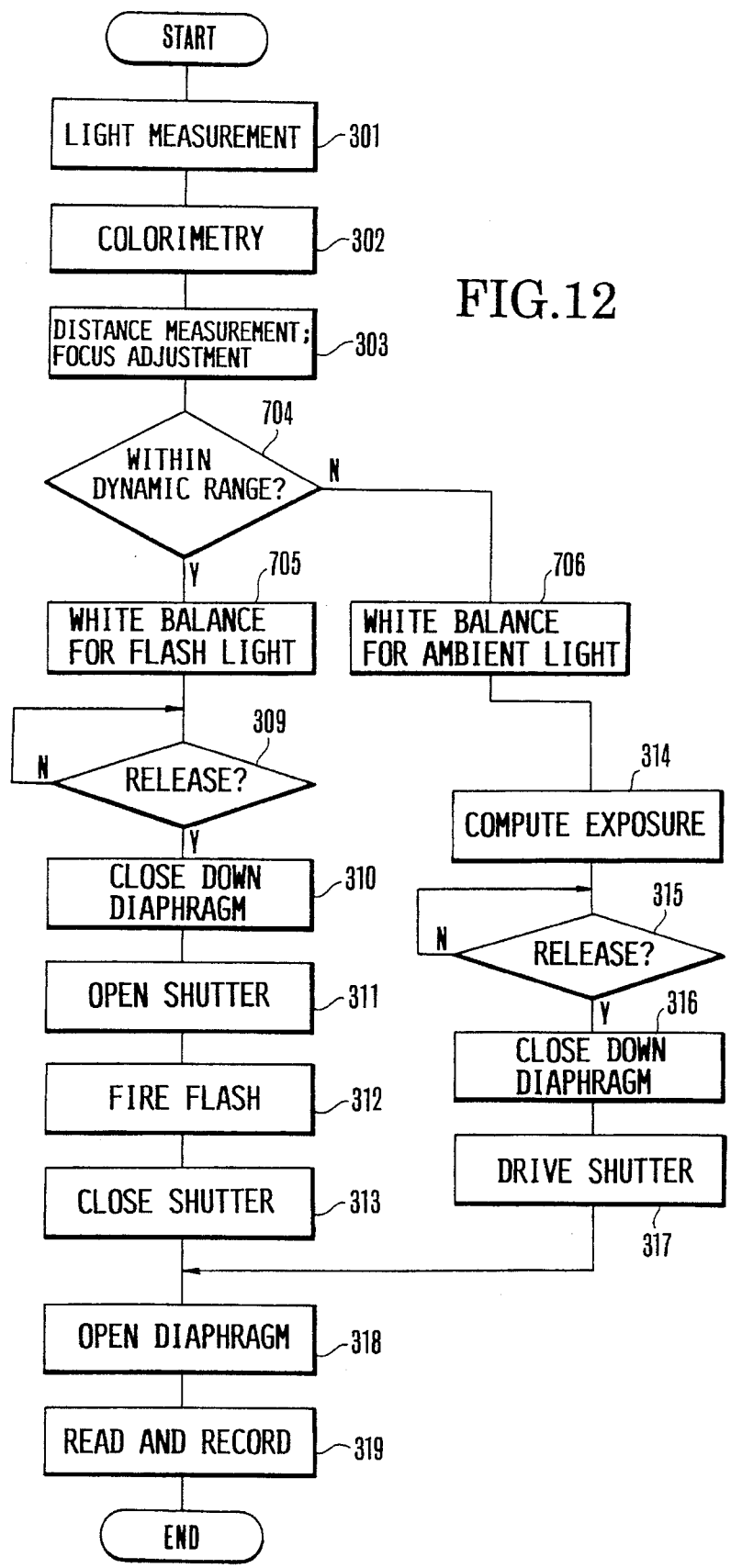
FIG. 12 is a flowchart to explain the operation of a fifth embodiment of this invention.

Next, while referring to the flowchart of FIG. 12, a fifth embodiment of the image pickup apparatus according to this invention is described. Since this embodiment is different only in part from the fourth embodiment, explanation about the duplicated parts is omitted.

In flash light photography, for when it is judged to be outside the dynamic range, the white balance is adjusted in accordance with the ambient light (step 706), the exposure control is carried out according to the exposure computation in the ambient light. To this purpose, on the basis of the light measurement result in the step 301, the exposure computation is carried out (step 314).

After that, actuation of the release switch 13 is waited for (step 315). When the release actuation has taken place, the diaphragm 2c is closed down according to the computation result in the step 314 (step 316), and the shutter 2a is driven by the driver 2b to expose the image pickup element 3 for the time determined in the step 314 (step 317).

By making it like this, in the case that in flash light photography, it has been judged to be outside the dynamic range, the flash device is not fired to save energy and an optimum shot setting to ambient light photography becomes possible.

It should be noted that the exposure computation in the step 314 may be carried out according to the program as shown in FIG. 5. Again, it may be otherwise carried out according to the predetermined mode (shutter priority, aperture priority, etc.).

Figure 13:
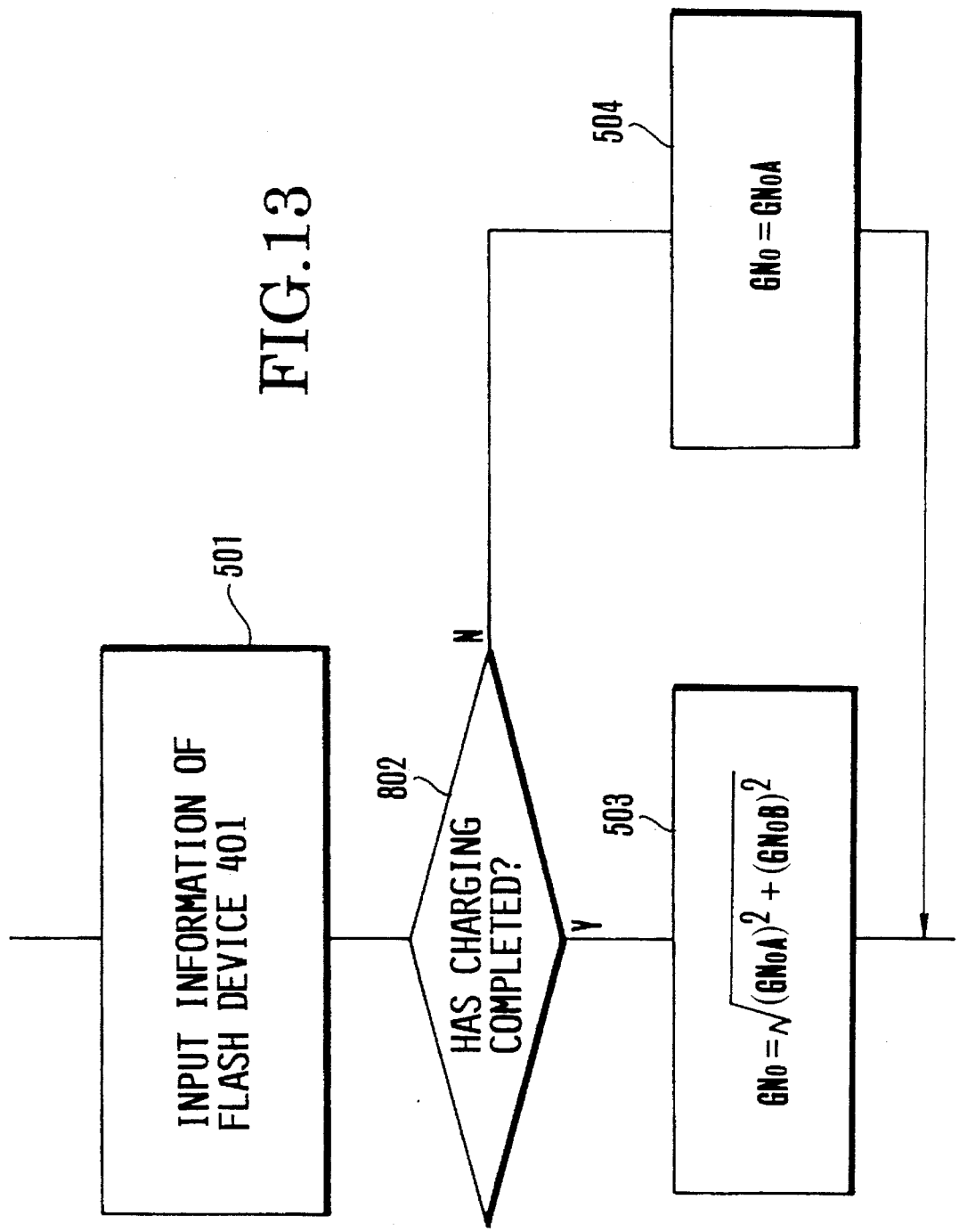
FIG. 13 is a flowchart illustrating the operation of a sixth embodiment.

Next, the operation of a sixth embodiment of the invention is described on the basis of FIG. 13. In the arrangement of FIG. 6, when the electric power source (not shown) is thrown, information concerning whether or not charging is complete, light amount (GNoB), color temperature is outputted from the flash device 401 in FIG. 13 to the computation control circuit 14 (step 501). Then, the computation control circuit 14 judges whether or not the flash device 401 has completed full charging (step 802).

If the full charging is complete, the light amount to illuminate the object becomes the sum of the light amounts of the built-in flash device 12 and the external flash device 401 as expressed by the equation (7):

$$GNo = \sqrt{(GNoA)^2 + (GNoB)^2}$$

(step 503).

If the full charging is not complete, the light amount (GNo) to illuminate the object is only the light amount of the built-in flash device 12. That is, GNo=GNoA (step 504).

Also, on the adjustment of the white balance, in this embodiment, the external flash device 401 is added, totaling three illumination light sources. Therefore, on assumption that the ratio of the light amounts to illuminate the object is (The light amount of the ambient light) : (The light amount of built-in flash device 12) : (The light amount of the external flash device 401)

$$= p : q : r \tag{15}$$

$$p + q + r = 1 \tag{16}$$

then the white balance of the flash device 401 is made to be $$R:B:G=A_{R3}:A_{B3}:1 \tag{17}$$

and the amplification degrees $A_R$ and $A_B$ of the amplifiers 4 and 5 are made to be in relationship:

$$A_R=p'A_{R1}+q'A_{R2}+r'A_{R3} \tag{18}$$

$$A_B=p''A_{B1}+q''A_{B2}+r''A_{B3} \tag{19}$$

As to the correspondence from (p, q, r) to (p', q', r'), (p", q", r"), determination may be made in exactly the same way as in the first embodiment, and the information may be memorized in the computation control circuit 14.

What is claimed is:

1. An image pickup apparatus coupled with a flash device, comprising:
   (a) image pickup means for generating a plurality of electrical color image signals from an optical image;
   (b) measuring means for measuring the distance to an object to be photographed; and
   (c) control means for comparing the light emission power of said flash device with the measured distance by said measuring means and for controlling color balance of said plurality of electrical color image signals in accordance with a comparison result.

2. An apparatus according to claim 1, wherein said control means also actuates said flash device in accordance with said comparison result.

3. An image pickup apparatus coupled with a flash device, comprising:
   (a) image pickup means for generating a plurality of electrical color image signals from an optical image;
   (b) measuring means for measuring the distance to an object to be photographed; and
   (c) control means for discriminating the light emission power of said flash device according to the measured distance by said measuring means and for controlling color balance of said plurality of electrical color image signals in accordance with a discrimination result, said control means controlling said color balance suited for color temperature of flash light of said flash device in a case where the light emission of said flash device is above a predetermined level.

4. An image pickup apparatus coupled with a flash device, comprising:
   (a) image pickup means for generating a plurality of electrical color image signals from an optical image;
   (b) measuring means for measuring the distance to an object to be photographed; and
   (c) control means for discriminating the light emission power of said flash device according to the measured distance by said measuring means and for controlling color balance of said plurality of electrical color image signals in accordance with a discrimination result, said control means controlling said color balance suited for color temperature of flash light of said flash device in a case where the light emission of said flash device is above a predetermined level, said control means controlling said color balance for color temperature of ambient light in a case where the light emission power of said flash device is under a predetermined level.

5. An image pickup apparatus coupled with an illumination device, comprising:

(a) image pickup means for generating a plurality of electrical color image signals from an optical image;

(b) measuring means for measuring the distance to an object to be picked up; and (c) control means for controlling color balance of said plurality of electrical color image signals in accordance with either one of a color temperature information of said illumination device and color temperature information of ambient light, which are alternatively selected based on the distance measured by said measuring means.

6. An apparatus according to claim 5, wherein said control means also actuates said illumination device in accordance with the measured distance.

7. An image pickup apparatus coupled with a flash device, comprising:

(a) image pickup means for generating a plurality of electrical color image signals from an optical image;

(b) measuring means for measuring the distance to an object to be photographed; and (c) control means for controlling color balance of said plurality of electrical color image signals in accordance with the measured distance by said measuring means.

8. An apparatus according to claim 7, wherein said control means also actuates said flash device in accordance with the measured distance.

9. An apparatus according to claim 7, further comprising:

(d) storing means for storing color temperature information of said flash device.

10. An apparatus according to claim 9, wherein said control means is arranged to control color balance of said plurality of electrical color image signals on the basis Of the color temperature information stored in said storing means.

11. An image pickup apparatus coupled with an illumination device, comprising:

(a) image pickup means for generating a plurality of electrical color image signals from an optical image;

(b) measuring means for measuring the distance to an object to be picked up; and (c) control means for controlling color balance of said plurality of electrical color image signals based on the measured distance by said measuring means.

12. An apparatus according to claim 11, wherein said control means also actuates said illumination device in accordance with the measured distance.

13. An apparatus according to claim 11, further comprising:

(d) storing means for storing color temperature information of said illumination device.

14. An apparatus according to claim 13, wherein said control means is arranged to control color balance of said plurality of electrical color image signals on the basis of the color temperature information stored in said storing means.

15. An apparatus according to claim 13, further comprising:

(d) storing means for storing color temperature information of said illumination device.

16. An apparatus according to claim 15, further comprising:

means for forming an ambient information which corresponds to a status of ambient light.

17. An apparatus according to claim 16, wherein said control means controls the color balance of said plurality of electrical color image signals in accordance with said ambient information.

18. An apparatus according to claim 17, wherein said ambient information relates to a brightness of the ambient light.

19. An apparatus according to claim 17, wherein said ambient information relates to a color temperature of the ambient light.

* * * * *

UNITED STATES PATENT AND TRADEMARK OFFICE
CERTIFICATE OF CORRECTION

PATENT NO. : 5,568,187
DATED : October 22, 1996
INVENTOR(S) : Okino, Tadashi

It is certified that error appears in the above-identified patent and that said Letters Patent are hereby corrected as shown below:

| | | | | |
|---|---|---|---|---|
| Col. 1, line 7, | delete | "1992" | and insert | -- 1988 --. |
| Col. 5, line 20, | delete | "AB2:1" | and insert | -- $A_{B2}:1$ --. |
| Col. 5, line 25, | delete | "I'A" | and insert | -- lA --. |
| Col. 7, line 3, | after | "$\sqrt{(GN_0A)^2+(GN_0B)^2}$....14" | insert | -- (Step 503). |
| Col. 7, line 12, | delete | "T" | and insert | -- $T_1$ --. |
| Col. 12, line 1, | delete | "Of" | and insert | -- of --. |

Signed and Sealed this

Ninth Day of June, 1998

Attest:

BRUCE LEHMAN

Attesting Officer

Commissioner of Patents and Trademarks